United States Patent [19]
Clayton

[11] Patent Number: 5,578,759
[45] Date of Patent: Nov. 26, 1996

[54] PRESSURE SENSOR WITH ENHANCED SENSITIVITY

[75] Inventor: Lawrence D. Clayton, Sandy, Utah

[73] Assignee: Quartzdyne, Inc., Salt Lake City, Utah

[21] Appl. No.: 509,195

[22] Filed: Jul. 31, 1995

[51] Int. Cl.$^6$ .................................................. G01L 11/00
[52] U.S. Cl. ............................................ 73/702; 310/338
[58] Field of Search ............................ 73/702, 862.59; 310/338, 348, 353

[56] References Cited

U.S. PATENT DOCUMENTS

| | | | |
|---|---|---|---|
| 3,355,949 | 12/1967 | Elwood et al. | 73/702 |
| 3,561,832 | 2/1971 | Karrer et al. | 310/338 |
| 3,617,780 | 11/1971 | Benjaminson et al. | 310/344 |
| 4,215,570 | 8/1980 | EerNisse | 73/862.59 |
| 4,547,691 | 10/1985 | Valdois et al. | 310/361 |
| 4,550,610 | 11/1985 | EerNisse | 73/702 |
| 4,562,375 | 12/1985 | Besson et al. | 310/338 |
| 4,660,420 | 4/1987 | EerNisse | 73/702 |
| 4,754,646 | 7/1988 | EerNisse | 73/702 |
| 4,802,370 | 2/1989 | EerNisse | 73/702 |
| 5,221,873 | 6/1993 | Totty et al. | 310/361 |
| 5,231,880 | 8/1993 | Ward et al. | 73/702 |
| 5,471,882 | 12/1995 | Wiggins | 73/702 |

FOREIGN PATENT DOCUMENTS 3705471A 9/1988 Germany ........................ 310/338

OTHER PUBLICATIONS

EerNisse, Errol P., "Quartz Resonator Pressure Gauge: Design and Fabrication Technology", Sandia Laboratories Report No. SAND78–2264, 1978.

*Primary Examiner*—Richard Chilcot
*Assistant Examiner*—Paul D. Amrozowicz
*Attorney, Agent, or Firm*—Trask, Britt & Rossa

[57] ABSTRACT

A pressure sensor having enhanced sensitivity without loss of accuracy over a broad pressure range. The sensor includes a resonator element sandwiched between two hollow end caps to form a sealed assembly. The sidewall thickness of the end caps abutting the resonator element is greater than the sidewall thickness at an area longitudinally spaced from the resonator, and the two dimensions may be selected to enhance sensitivity while maintaining accurate sensor performance. End cap endwalls of non-uniform thickness are employed with the thinnest endwall portion at the center and the thickest at the lateral periphery of the endwall. The rate of increase of end wall thickness toward the periphery may be modified to control the upper end of the pressure range in which the sensor is operable.

33 Claims, 3 Drawing Sheets

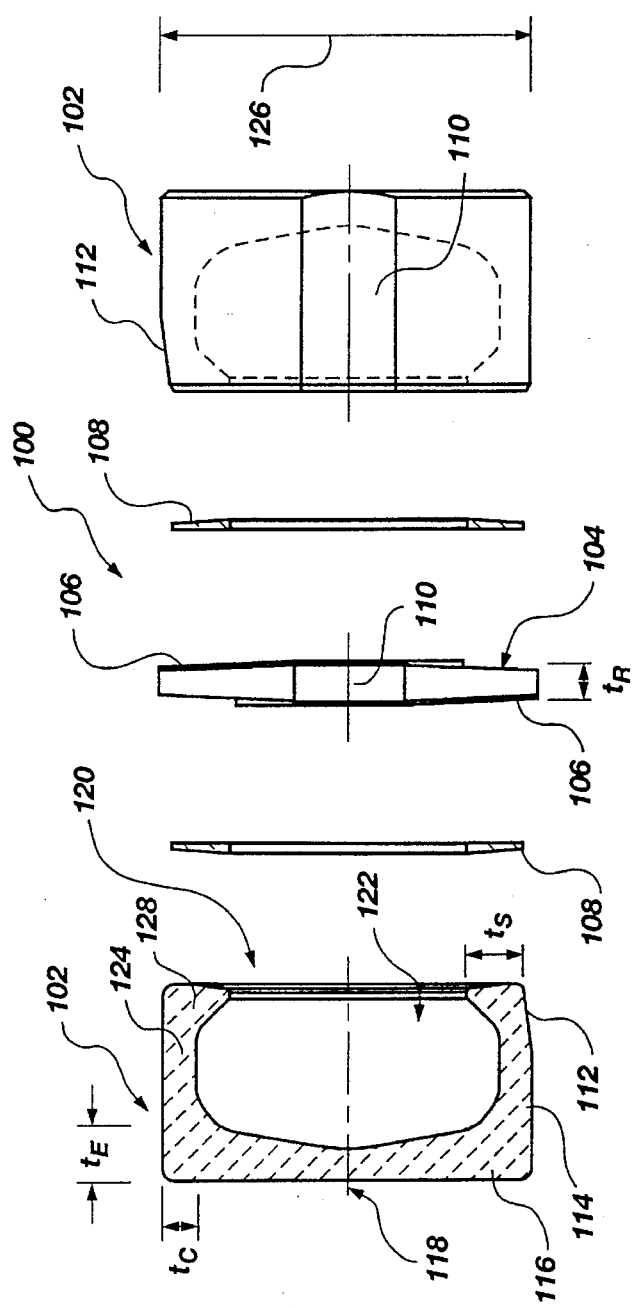
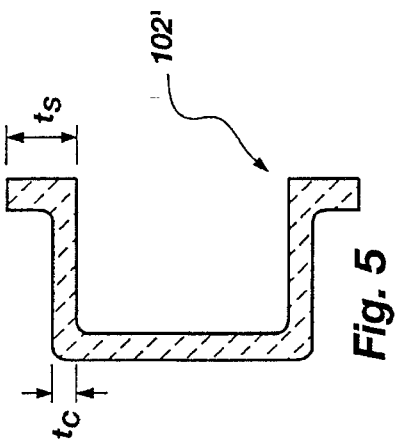
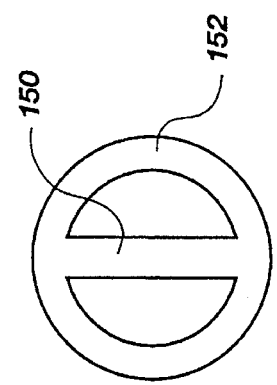
Fig. 3
Fig. 5
Fig. 6

PRESSURE SENSOR WITH ENHANCED SENSITIVITY

BACKGROUND OF THE INVENTION

1. Field of the Invention

The present invention relates to a pressure sensor suitable for use downhole in oil, gas, geothermal and other wells, at the wellhead, in industrial applications, for portable calibration devices and in laboratory applications. More specifically, by way of example and not limitation, the invention in its prefected embodiment relates to a piezoelectrically-driven quartz crystal resonator pressure sensor configured for enhanced sensitivity and accuracy.

2. State of the Art

The type of quartz crystal pressure transducer assembly in which sensors as disclosed herein may preferably be employed includes a first pressure sensitive quartz crystal resonator, a second temperature sensitive quartz crystal resonator, a third reference frequency quartz crystal resonator, and supposing electronics. For convenience, the terms "crystal" and "resonator" may be used interchangeably herein in referencing a resonating quartz crystal element.

In a transducer assembly of the referenced type, the first crystal changes frequency in response to changes in applied external pressure and temperature, while the output frequency of the second crystal is used to temperature compensate temperature-induced frequency excursions in the first and third crystals. The third crystal generates a reference signal, which is only slightly temperature dependent, against or relative to which the temperature and pressure-induced frequency changes in the first crystal and the temperature-induced frequency changes of the second crystal can be compared. Means for comparison as known in the art include frequency mixing and/or using the reference frequency to count the signals from the other two crystals. The first resonator is exposed via a fluid interface to the external pressure sought to be measured, and all three resonators are preferably thermally coupled to the fluid to provide a rapid thermal response time. The transducer (crystals plus electronics, the latter disposed in a pressure housing) is calibrated as a complete unit over the intended pressure and temperature range so that all temperature and pressure related effects can be compensated for in the resulting calibration curve-fit coefficients. Exemplary patents for transducers using three crystal resonators, each assigned a function as described above, are U.S. Pat. No. 3,355,949 to Elwood et al., U.S. Pat. No. 4,802,370 to EerNisse et al. and U.S. Pat. No. 5,231,880 to Ward et al.

The first crystal, or pressure sensor crystal, employed in pressure transducer assemblies of the prior art, has been commonly configured to include a disc-shaped resonator element incorporated in a tubular cylindrical housing assembly, the ends of the housing assembly being closed. The cylindrical housing assembly, when subjected to exterior pressure of a fluid to be monitored, elastically deforms and thus causes the frequency of the resonator element to shift, the frequency output thus being indicative of the pressure. As noted above, the frequency output may then be preferably temperature-compensated, as known in the art. Exemplary pressure sensor crystal configurations are disclosed in U.S. Pat. No. 3,561,832 to Karrer et al., U.S. Pat. No. 3,617,780 to Benjaminson et al., U.S. Pat. No. 4,550,610 to EerNisse, U.S. Pat. No. 4,660,420 to EerNisse, U.S. Pat. No. 4,754,646 to EerNisse et al., U.S. Pat. No. 4,802,370 to EerNisse et al., U.S. Pat. No. 5,221,873 to Totty et al., and in EerNisse, "Quartz Resonator Pressure Gauge: Design and Fabrication Technology," Sandia Laboratories Report No. SAND78-2264, (1978).

U.S. Pat. No. 4,660,420 to EerNisse recognizes the desirability of selecting a pressure crystal with a crystal cut having substantial independence from temperature-induced frequency changes over the intended range of temperatures, as well as a relatively large scale factor, i.e., greater frequency sensitivity to pressure changes in the range to be measured. For the pressure and temperature ranges experienced in oil and gas wells, an AT-cut quartz crystal is disclosed in EerNisse '420 to possess these attributes.

Yet another EerNisse patent, U.S. Pat. No. 4,754,646, discloses the use of an integral housing and resonator section preferably formed from AT-cut, BT-cut or rotated X-cut quartz, but does not distinguish the performance characteristics of any of the various cuts, or recommend a particular cut. Rather, EerNisse '646 seeks to reduce resonator resistance and pressure hysteresis via particular physical configurations of the resonator and its area of joinder to the outer cylindrical shell.

While prior art devices as referenced above have attempted to address various deficiencies in the generic quartz resonator sensor design, those of ordinary skill in the art have failed to recognize that pressure sensitivity of such sensors may be greatly enhanced and inaccuracy reduced over a broad pressure range through certain relatively straightforward modifications to physical parameters of the sensor configuration. It has also gone unrecognized that the upper limit of the range of such enhanced-sensitivity sensors may be readily altered through other, equally straightforward modifications to the sensor, so that a sensor may offer such enhanced sensitivity and accuracy over a much larger range than prior art sensors.

SUMMARY OF THE INVENTION

The most preferred physical configuration for the pressure sensor of the present invention employs a pressure crystal assembly comprising a disc-shaped pressure crystal resonator section abutted on both sides at its perimeter by two hollowed-out, generally cylindrical end caps of like diameter, resonators of such design being disclosed in the aforementioned U.S. Pat. No. 5,221,873 to Totty et al., and in EerNisse, "Quartz Resonator Pressure Gauge: Design and Fabrication Technology," Sandia Laboratories Report No. SAND78-2264, (1978). The preferred resonator configuration is bi-convex, while the preferred crystallographic orientations of such sensor assembly include AT-cut, BT-cut, RT-cut and a single rotation cut having an angle within a range between about $-25°$ and about $-45°$ relative to the Z axis, the latter as disclosed and claimed in the aforementioned '873 patent to Totty et al.

In the sensor of the present invention of the general configuration described above, the resonator disc is sealed along the outer periphery of each of its two faces to an end cap via a continuous glass joint. A reentrant end cap configuration is employed, wherein the radial thickness of the end cap sidewall at the mouth or proximal portion of the end cap proximate the resonator disc at the location of the disc/end cap joints is greater than the end cap sidewall thickness at a location longitudinally or axially spaced from the disc. The reentrant design, by providing a relatively large sealing area between the end caps and the disc, enhances sensor accuracy by minimizing stresses transmitted from the end caps through the intervening glass joint to the disc. Inelastic error arising from hysteresis and joint creep are, in turn, reduced without compromising the enhanced sensitivity achieved through use of more flexible, lesser-thickness sidewalls away from the end cap/resonator joint. Sensor sensitivity may also be enhanced by employing a relatively thinner resonator in combination with the disclosed end cap sidewall configuration. The rapidity of the transition between the joint-face end cap sidewall thickness and the reduced-thickness sidewall area also affects sensitivity.

Another aspect of the invention involves design or modification of the end caps to extend sensor range while maintaining the enhanced sensitivity of the sensor. Cracking and fracture in quartz are induced by tensile stresses, which have been found to be induced at the bottom of the end cap bores at the center of the inner surface of the endwalls, as well as along the outer peripheries of the endwall external surfaces when the sensor is subjected to external pressure. Such stresses are therefore a factor limiting the sensor's ultimate range. It has been discovered that judicious modification of the endwall configuration to reduce or eliminate tensile stresses due to externally applied pressure at the center of the endwall interior surface at the bottom of the end cap bore and radial tensile stresses at the outer edge of the end cap external surface can extend sensor range without affecting sensitivity. Such modifications involve configuring the end caps with endwalls which increase in thickness from a minimum at the center or longitudinal axis of the end cap toward the side of the end cap. The rapidity of such increase affects sensor range, with a steeper slope or rate of increase providing a higher end to the sensor's pressure range.

BRIEF DESCRIPTION OF THE DRAWINGS

The present invention will be more fully understood by one of ordinary skill in the art through a review of the following detailed description of the preferred embodiments in conjunction with the accompanying drawings, wherein:

FIG. 3 comprises an exploded side partial sectional elevation of a preferred embodiment of a resonator pressure sensor according to the present invention;

FIG. 5 comprises a schematic side sectional elevation of an alternative end cap configuration for use in the preferred embodiment of FIG. 3 where external diameter of the sensor is not a limiting design factor; and FIG. 6 comprises a front elevation of an alternative sensor element configuration suitable for use in a pressure sensor according to the present invention.

DETAILED DESCRIPTION OF THE PREFERRED EMBODIMENTS

Figure 1:
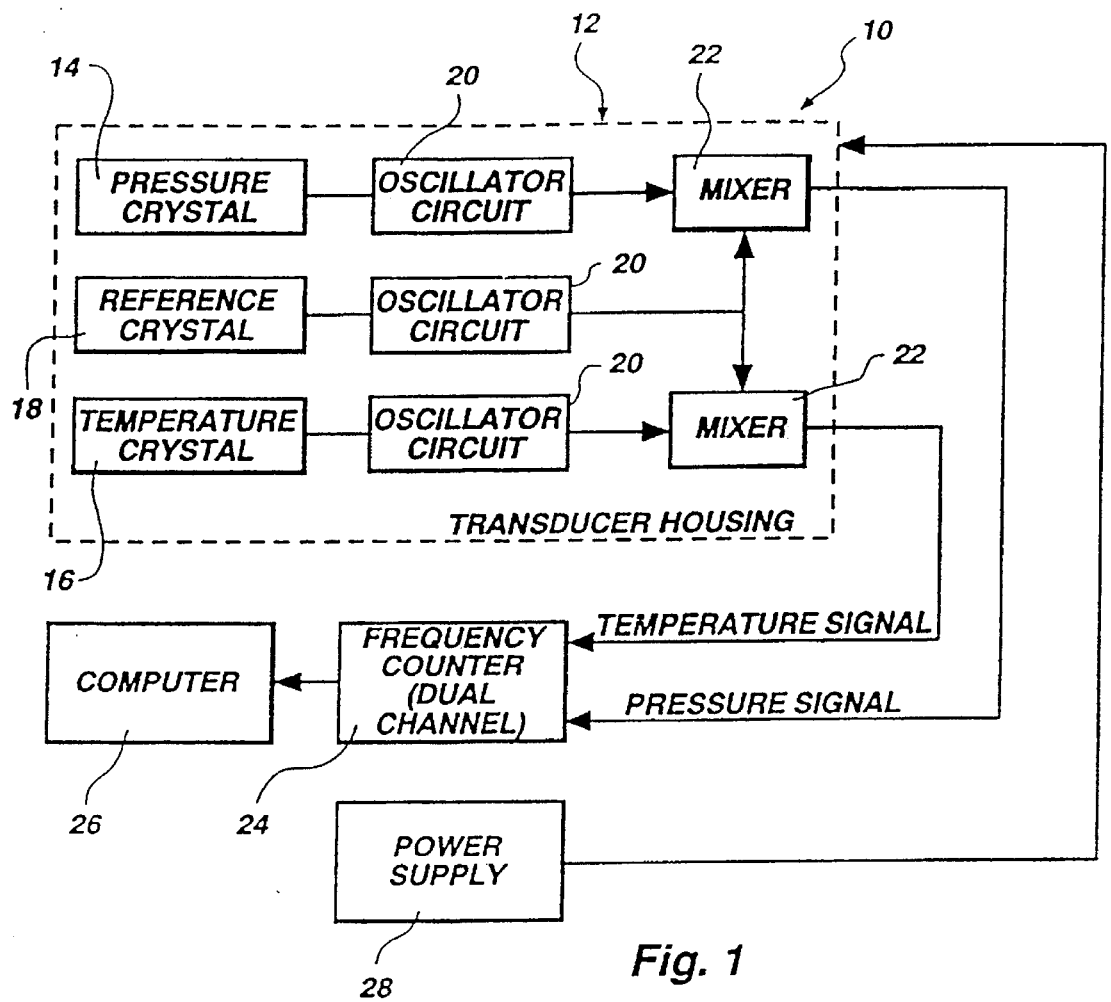
FIG. 1 comprises a block diagram of a transducer for pressure and temperature measurement in which the resonator pressure sensor of the present invention may be employed.

Referring now to FIG. 1 of the drawings, there is depicted an exemplary transducer 10 for sensing pressure and temperature, and having utility, as noted above, for both downhole and surface applications. Transducer 10 includes electronics which drive and respond to the output of quartz crystal resonators. The electronics and resonators are preferably contained within a common housing, such as pressure housing 12, although this is not a requirement of the invention.

There are three resonators, including a pressure crystal 14, a temperature crystal 16 and a reference crystal 18. The pressure and temperature to be sensed are of a fluid (for purposes of this invention, fluid is defined as either the liquid or gaseous state) medium which is preferably in thermal contact with all three crystal assemblies, but only the pressure crystal 14 is subjected to the pressure of the fluid temperature crystal 16 and reference crystal 18 being intentionally isolated from pressure effects by their packaging and location.

The transducer electronics includes features well known in the art, such as oscillator circuits 20 and mixer circuits 22. The oscillator circuits 20, which are coupled to electrodes associated with each of the quartz crystal resonators, piezoelectrically drive the quartz crystal resonators to vibrate in a manner well known in the art and transmit the frequency output of the oscillators to mixer circuits 22. The mixed outputs are then transmitted to processor circuits, such as frequency counter 24, exterior to the transducer 10. The processor circuits receive the mixed frequency outputs of the crystals and convert same to values representative of pressure and temperature data. The temperature output frequency may also be employed to enhance the accuracy of the pressure data by compensating for temperature-induced frequency deviations of the pressure and reference crystals. Actual pressure and temperature data is developed via a computer 26 receiving output from frequency counter 24. Power for the transducer is supplied by a DC power supply 28, which may comprise batteries of any suitable power, voltage and temperature stability. In industrial or laboratory applications, the power supply may, of course, comprise a conventional DC power supply.

Figure 2:
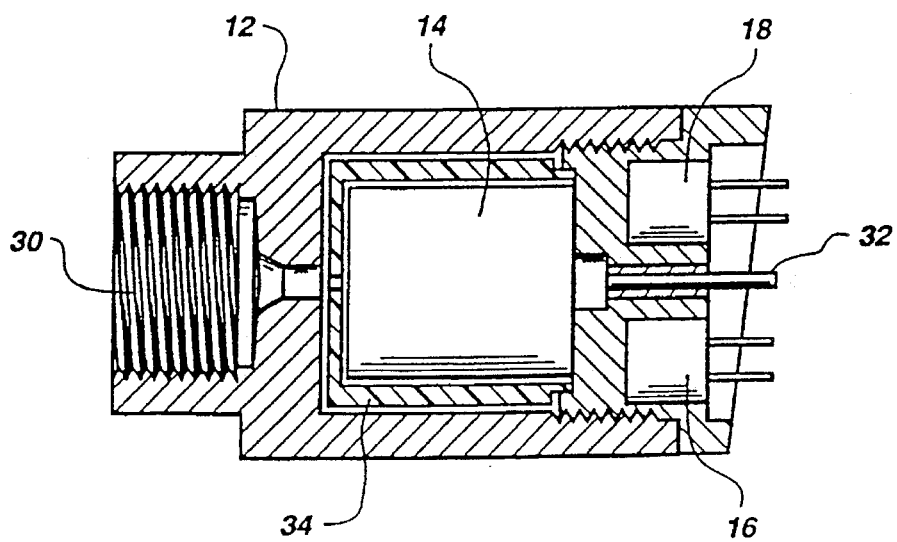
FIG. 2 comprises a schematic cross-sectional representation of a sensor arrangement of a transducer in which the resonator pressure sensor according to the present invention may be employed.

FIG. 2 depicts a suitable physical arrangement of crystals 14, 16 and 18 in transducer 10 wherein, as previously noted, pressure crystal 14 is exposed to fluid pressure via inlet 30, while temperature crystal 16 and reference crystal 18 are isolated from the pressure by housing 12, electrical feedthrough 32 for pressure crystal 14 being pressure proof. If desired, an electrically insulating spacer 34 may be placed about pressure crystal 14 to generally support same while permitting pressurized fluid access to substantially surround the entire exterior thereof.

FIG. 3 depicts a preferred sensor embodiment 100 of a pressure crystal 14 suitable for use in transducer 10 or any other transducer with appropriate drive and sensing electronics as known in the art. Sensor 100 includes two end caps 102 flanking a bi-convex resonator disc 104 having drive and sensing electrodes 106 applied to its exterior. When assembled, end caps 102 are sealed to the exterior of disc 104 using sealing glass 108, which comprises a devitrifying sealing glass as known in the art. Other features of sensor 100, as known in the art, include shallow alignment flats 110 to promote precise alignment of components 102 and 104 during assembly and notches 112 to afford access to the end tabs of electrodes 106 after assembly of the sensor. But for the alignment flats 110 and access notches 112, sensor 100 is preferably generally symmetrical about longitudinal axis 118.

As noted previously, the preferred crystallographic orientations of such sensor assembly include AT-cut, BT-cut, RT-cut and a single rotation cut having an angle within a range between about −25° and about −45° relative to the Z axis, as disclosed and claimed in the aforementioned '873 patent to Totty et al. However, any cut at or near the zero temperature coefficient locus may be employed, including the SBTC-cut and IT-cut. Broadly, the selected cut need not have a zero first order temperature coefficient to minimize temperature sensitivity. Essentially, any crystallographic orientation which shifts frequency with planar normal stresses could be successfully employed in the sensor of the invention.

Figure 4:
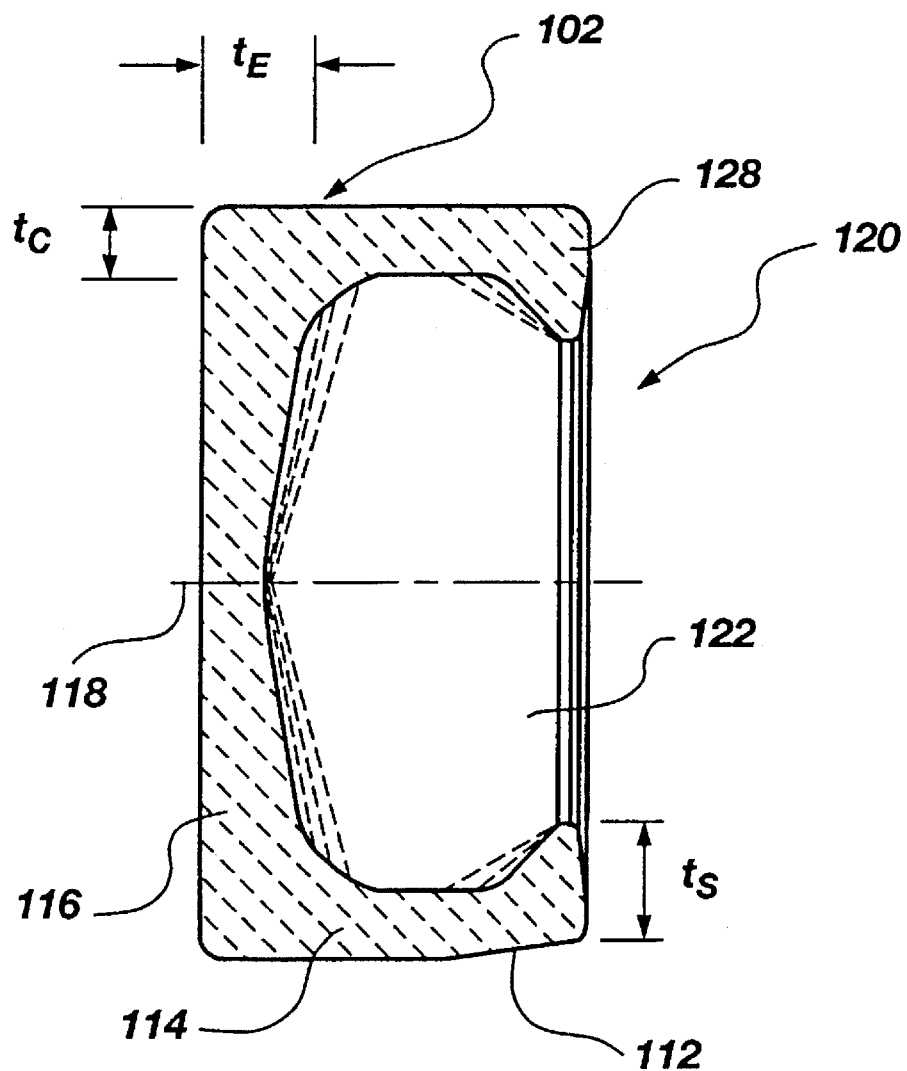
FIG. 4 comprises an enlarged side sectional elevation of one of the end caps of the sensor of FIG. 3, illustrating the manner in which the endwall and sidewall thickness may be modified.

As depicted in FIGS. 3 and 4, and in marked contrast to prior art end cap configurations, end caps 102 are of reentrant or recessed configuration, the term as generically employed herein signifying an end cap configuration wherein the sidewall 114 is of perceptibly greater thickness $t_s$ at the mouth or proximal end 120 of bore 122 than the sidewall thickness $t_s$ at a medial location 124 axially removed from mouth 120. The reentrant design of the present invention notably enhances sensitivity without compromising accuracy over a wide range of pressures, via enhanced flexure of end cap sidewalls 114 responsive to a given level of external pressure. This same design, with its greatly increased seal area between disc 104 and end caps 102, maintains sensor accuracy by minimizing stresses at the disc/end cap joint and reducing inelastic error attributable to joint creep and hysteresis. While end caps 102 are depicted in FIGS. 3 and 4 as having a substantially constant outer diameter or O.D. 126, this is due to the intended use of the illustrated embodiment of sensor 100 in a subterranean borehole, wherein the diameter of the tool in which it is placed is limited, thus dictating the maximum O.D. which may be employed. For applications which are not so limited, it is contemplated that an end cap configuration 102' such as is illustrated in FIG. 5 may be employed for easier machining of the end cap. The most significant aspect of the end cap design from a sensitivity and accuracy standpoint is thus the relative sidewall thicknesses $t_s$ and $t_c$ at the proximal and medial areas of the end cap sidewall and not the specific configuration by which such relative thicknesses are achieved. It is also noted that the rapidity of the transition between $t_s$ and $t_c$ in transition region or reentrant corner 128 affects sensor sensitivity; the more rapid or steep the transition (alternatives shown in broken lines on FIG. 4), the greater sensitivity enhancement for a given $t_s$ and $t_c$. Sensitivity may also be enhanced by elongating end caps 102 axially until the sidewall length of thickness $t_c$ is equal to substantially three times the sidewall thickness $t_c$. Further, sensitivity may be enhanced via reduction of maximum thickness $t_R$ of resonator 104.

Another aspect of the present invention involves modification of the cross-sectional configuration of the distal portions or endwalls 116 of end caps 102. It has been established by the inventors herein that endwall configuration and the thickness $t_E$ thereof is a limiting factor on the upper end of the pressure range in which sensor 100 may operate without damage or failure, although differences in $t_E$ do not noticeably affect the sensitivity of the sensor. As depicted in FIGS. 3 and 4, end cap endwall thickness $t_E$ is at a minimum proximate axis 118, increasing as endwall 116 extends toward sidewall 114. The rate of increase is preferably substantially linear, although a nonlinear slope might also be employed. Thickness $t_E$ and the rate of increase thereof as endwall 116 extends toward sidewall 114 affect the range of sensor 100, alternative configurations being shown in broken lines in FIG. 4. The greater the rate of increase, the higher the upper end of the sensor's pressure range. Placing the minimum endwall thickness $t_E$ proximate axis 118 increases the bending stiffness of endwall 116 and allows radial compressive stresses transmitted from the sidewall 114 of the end cap 102 to concentrate proximate the center of the end caps 102. The resulting isolation of tensile stresses in the end cap, which limit sensor range from compressive stresses in the resonator (which control sensitivity), permits the use of a longer side wall, up to the previously-mentioned length of three times the sidewall width $t_c$. It is desirable that the endwall 116 be as thin as possible proximate axis 118, consistent with limitations imposed by material integrity considerations and limitations imposed by manufacturing techniques.

The preferred embodiment of the sensor of the present invention, as previously noted, employs a resonator disc, preferably of bi-convex configuration and preferably extending imperforately to the outer perimeter thereof. It is also contemplated, however, that other resonator configurations may be employed, including flat-surfaced discs or bi-concave discs. Discs or bars suspended from an outer ring, such as are disclosed in U.S. Pat. Nos. 4,562,375 to Besson et al. and 4,547,691 to Valdois et al., may also be employed. Similarly, while quartz has been disclosed as the preferred material, the sensor of the present invention might also be fabricated from any other suitable crystalline or noncrystalline material. Sapphire, langasite and piezoresistive silicon are examples of suitable crystalline materials, while Elinvar™ and NiSpanC™ alloy are examples of suitable noncrystalline materials. Of course, the manner in which the resonator is excited may vary, depending upon the sensor material employed, so that in certain cases magnetic or capacitative excitation techniques as known in the art would be employed in lieu of piezoelectric excitation.

Other sensing elements usable at the location of disc 104 include double-ended tuning forks such as are disclosed in U.S. Pat. No. 4,215,570 to EerNisse, vibrating wires, piezoresistive elements, strain gages, one-or-more beam resonant force sensing elements, or a strip-type thickness shear mode element. A generic illustration for such alternative sensing elements 150 is depicted in FIG. 6 of the drawings, sensor element 150 being supported by an outer ring of material 152 to which end caps 102 may be sealed. It will be appreciated that the FIG. 6 sensing element arrangement is similar to several of the embodiments disclosed in the aforementioned '375 and '691 patents. It will also be appreciated that, if a non-resonating type sensor element is employed, the associated electronics will differ substantially from that disclosed with respect to the preferred embodiment. For example, if a piezoresistive sensor element is employed, no drive structure is required, but only signal detection structure, which may comprise a wheatstone bridge and current source, as known in the art.

While the present invention has been described in terms of certain exemplary preferred embodiments, it will be readily understood and appreciated by one of ordinary skill in the art that it is not so limited, and that many additions, deletions and modifications to the preferred embodiments may be made within the scope of the invention as hereinafter claimed.

What is claimed is:

1. A pressure sensor, comprising:

a sensor element having a peripheral support structure including two opposing faces;

first and second longitudinally-extending end caps each having a blind interior bore defined at its bottom by a transversely oriented endwall from which a sidewall extends longitudinally to an open mouth, said mouth of each of said end caps being adjacent said sensor element and each end cap being secured to one of said faces of said peripheral support structure; and said sidewall of each end cap including a proximal portion surrounding said mouth and by which said end cap is secured to said support structure, said proximal portion being of greater thickness than a medial portion of said sidewall longitudinally spaced from said mouth.

2. The pressure sensor of claim 1, wherein said end cap proximal portion greater sidewall thickness is provided by a radially-inwardly extending annular shoulder.

3. The pressure sensor of claim 1, wherein said end cap proximal portion greater sidewall thickness is provided by a radially-outwardly extending annular flange.

4. The pressure sensor of claim 1, further including a longitudinally extending transitional portion along said sidewall between said proximal portion and said medial portion wherein said sidewall thickness is gradually reduced therebetween.

5. The pressure sensor of claim 4, wherein said gradual reduction in sidewall thickness is a substantially linear reduction.

6. The pressure sensor of claim 1, wherein said material of said sensor element and said end caps comprises a material selected from the group consisting of quartz, sapphire, langasite, silicon, Elinvar™ metal and NiSpanC™ alloy.

7. The pressure sensor of claim 1, wherein said sensor element comprises a crystalline quartz resonator excitable to vibrate in the thickness-shear mode.

8. The pressure sensor of claim 1, wherein said material of said sensor element and said end caps comprises crystalline quartz of a cut selected from the group of cuts on or near the zero temperature coefficient locus.

9. The pressure sensor of claim 8, wherein said group of cuts is selected from the cuts comprising:

AT-cut, BT-cut, RT-cut, a single rotation cut having an angle within a range between about −25° and about −45° relative to the Z axis, SBTC-cut, and IT-cut.

10. The pressure sensor of claim 1, wherein said endwall of each of said end caps is configured with a thickness gradually and substantially linearly increasing from the center thereof as said endwall extends laterally toward said sidewall.

11. The pressure sensor of claim 1, wherein said sensor element comprises a disc and said peripheral support structure comprises the portions of said faces at the periphery of said disc.

12. The pressure sensor of claim 11, wherein said disc is imperforate.

13. The pressure sensor of claim 1, wherein said sensor element comprises a linear element and said peripheral support structure comprises a planar ring of material to which said linear element is secured.

14. The pressure sensor of claim 13, wherein said linear element extends diametrically across said planar ring of material.

15. The pressure sensor of claim 13, wherein said linear element extends transversely to said planar ring of material.

16. The pressure sensor of claim 1, wherein said sensor element comprises a vibratory element, a resonant frequency of which varies in response to pressure applied to the exterior of said sensor.

17. The pressure sensor of claim 1, wherein said sensor element and said end caps are formed of quartz, and are secured together by sealing glass interposed between said proximal portions and said faces of said peripheral support structure.

18. The pressure sensor of claim 1, further including electronics to drive and respond to an output of said sensor element.

19. The pressure sensor of claim 1, further including electronics to respond to an output of said sensor element.

20. A crystalline quartz pressure sensor, comprising:

a two-faced, bi-convex resonator disc; and first and second hollow, substantially cylindrical end caps of substantially the same diameter as said disc and including sidewalls extending transversely to said disc, one end cap being secured by its sidewall to each face of said disc along the periphery thereof;

the thickness of said sidewalls adjacent said disc faces being greater than the thickness of said sidewalls on at least one other portion of said end caps longitudinally farther from said disc.

21. The pressure sensor of claim 20, further including endwalls on said end caps integrally formed with said sidewalls.

22. The pressure sensor of claim 21, wherein said endwalls are configured with a thickness gradually and substantially linearly increasing from the center thereof as said endwalls extend toward said sidewalls.

23. The pressure sensor of claim 20, further including metallic electrodes plated on a portion of each face of said resonator disc and extending to the exterior of said pressure sensor.

24. The pressure sensor of claim 23, further including electronics to drive said resonator disc and respond to an output thereof through said electrodes.

25. The pressure sensor of claim 20, wherein said greater end cap sidewall thickness is provided by a radially-inwardly extending annular shoulder.

26. The pressure sensor of claim 20, wherein said greater end cap sidewall thickness is provided by a radially-outwardly extending annular flange.

27. The pressure sensor of claim 20, further including a longitudinally extending transitional portion on each of said end caps along said sidewall thereof between a location adjacent said disc and said at least one other portion of said sidewall wherein said sidewall is gradually reduced in thickness.

28. The pressure sensor of claim 27, wherein said gradual reduction in sidewall thickness is a substantially linear reduction.

29. The pressure sensor of claim 20, wherein said resonator disc is excitable to vibrate in the thickness-shear mode.

30. The pressure sensor of claim 20, wherein said material of said resonator disc and said end caps comprises crystalline quartz of a cut selected from the group of cuts on or near the zero temperature coefficient locus.

31. The pressure sensor of claim 30, wherein said group of cuts is selected from the cuts comprising:

AT-cut, BT-cut, RT-cut, a single rotation cut having an angle within a range between about −25° and about −45° relative to the Z axis, SBTC-cut, and IT-cut.

32. The pressure sensor of claim 20, wherein said resonator disc is imperforate.

33. The pressure sensor of claim 20, wherein said resonator disc and said end caps are secured together by sealing glass interposed between said faces at said periphery of said disc and said end cap sidewalls.

* * * * *

UNITED STATES PATENT AND TRADEMARK OFFICE
CERTIFICATE OF CORRECTION

PATENT NO. : 5,578,759
DATED : November 26, 1996
INVENTOR(S) : Clayton

It is certified that error appears in the above-identified patent and that said Letters Patent is hereby corrected as shown below:

In Column 1, line 13, change "prefected" to --preferred--.

In Column 1, line 22, change "supposing" to --supporting--;

In Column 5, line 18, change "t," to --$t_c$--;

In Column 7, lines 19 and 20, change "ther-ebetween" to --there-between--

In Column 7, line 54, change "ting" to --ring--.

Signed and Sealed this

Twenty-first Day of July, 1998

Attest:

BRUCE LEHMAN

*Attesting Officer*  *Commissioner of Patents and Trademarks*